United States Patent [19]
Saito et al.

[11] Patent Number: 5,381,671
[45] Date of Patent: Jan. 17, 1995

[54] AIR CONDITIONING APPARATUS WITH IMPROVED ICE STORAGE THEREIN

[75] Inventors: Kazuo Saito; Tsutomu Sakuma, both of Kanagawa, Japan

[73] Assignee: Kabushiki Kaisha Toshiba, Kawasaki, Japan

[21] Appl. No.: 91,029

[22] Filed: Jul. 14, 1993

[30] Foreign Application Priority Data

Jul. 14, 1992 [JP] Japan .................. 4-186955

[51] Int. Cl.⁶ .......................................... F25D 11/00
[52] U.S. Cl. .......................... 62/430; 62/59; 62/510
[58] Field of Search .................... 62/59, 430, 510

[56] References Cited

U.S. PATENT DOCUMENTS

| | | | |
|---|---|---|---|
| 2,185,515 | 1/1940 | Neeson | 62/59 X |
| 4,831,830 | 5/1989 | Swenson | 62/59 |
| 5,056,320 | 10/1991 | Winkler | 62/59 |
| 5,211,029 | 5/1993 | Uselton et al. | 62/59 X |
| 5,218,828 | 6/1993 | Hino | 62/59 |
| 5,255,526 | 10/1993 | Fischer | 62/59 |

FOREIGN PATENT DOCUMENTS

60-223967 11/1985 Japan .
62-141438 6/1987 Japan .
3-140767 6/1991 Japan .

*Primary Examiner*—William E. Tapolcai
*Attorney, Agent, or Firm*—Foley & Lardner

[57] ABSTRACT

An air conditioning apparatus apparatus equipped with a cooling and heating cycle utilizing a refrigerant and equipped with an improved ice storage therein. The air conditioning apparatus includes a thermal storage tank for storing heat of refrigerant circulating in the cooling cycle; thermal storage refrigerant positioned parallel to an indoor heat exchanger; an auxiliary compressing unit provided in the thermal storage refrigerant pipe; an expansion unit for controlling expansion of the refrigerant. An method for the air conditioning apparatus. The method includes the steps of providing an auxiliary compressor; cooling a gaseous refrigerant from the auxiliary compressor; heat-exchanging the gaseous refrigerant; condensing the refrigerant; sending the condensed refrigerant to the indoor heat exchanger; evaporating the condensed refrigerant; and sending the evaporated refrigerant back to the auxiliary compressor.

4 Claims, 7 Drawing Sheets

AIR CONDITIONING APPARATUS WITH IMPROVED ICE STORAGE THEREIN

BACKGROUND OF THE INVENTION

1. Field of the Invention

The present invention relates to a heat-pump type air conditioning apparatus equipped with heat storage capability therein.

2. Description of the Prior Art

The conventional systems will be described which are known to date in a heat regenerative type heat-pump air conditioning apparatus where a heat regenerative or ice storing refrigerant is also circulated to an air conditioning load side so as to perform a pleasant air conditioning.

Figure 1:
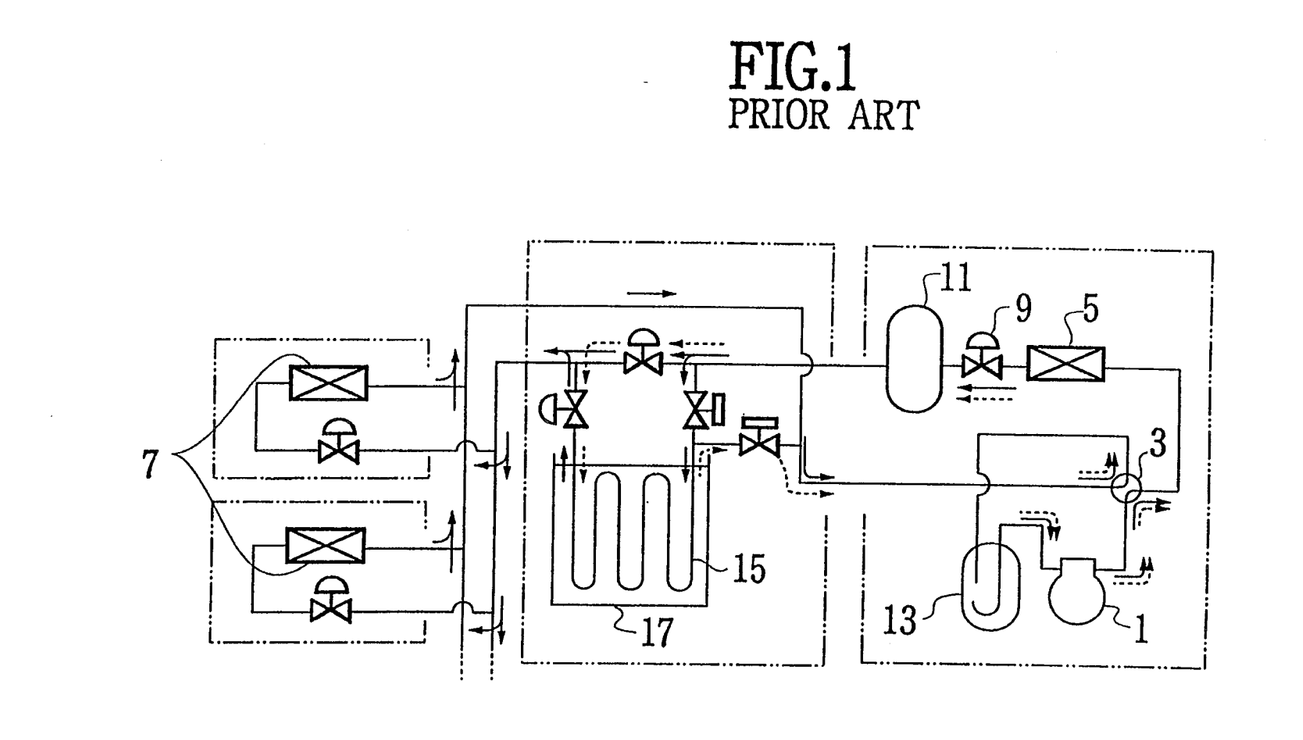
FIG. 1 is a configuration of a cooling cycle in the conventional conventional air conditioning apparatus.
Figure 2:
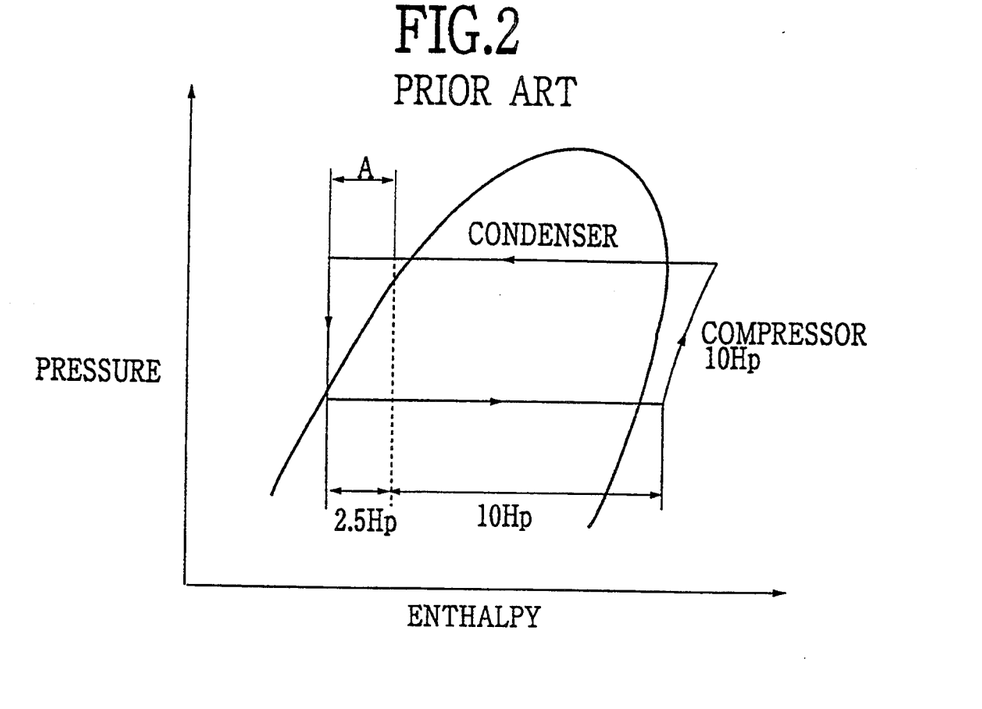
FIG. 2 is a Mollier diagram showing the cooling operational mode for the air conditioning apparatus shown in FIG. 1.

One of such examples for the conventional systems is shown in FIG. 1 in which there are provided a plurality of indoor units, compressor 1 for compressing the refrigerant, 4-way valve 3 for switching a flow direction of the refrigerant at the time of cooling and heating, respectively, outdoor heat exchanger 5, a plurality of indoor heat exchangers 7, expansion valve 9, liquid tank 11, ice storage heating tank equipped with accumulator 13 and ice making unit 15, or the like. The path of the ice melting operation is shown by solid arrows. The path of the ice making operation is shown by dashed arrows. Outdoor heat exchanger 5 serves as a condenser at the time of cooling operation while it serves as an evaporator at the time of heating operation. On the contrary, indoor heat exchangers 7 serve as the evaporator at the time of cooling whereas it serves as the condenser at the time of heating. Expansion valve 9 serves to decrease the pressure of the refrigerant. Liquid tank 11 stores a refrigerant liquid In the conventional system, a high-pressure liquid refrigerant that have flowed through outdoor heat exchanger 5 (serving as the condenser at the time of cooling) is further supercooled by ice making heat regenerative (storing) tank 17 so as to improve a cooling capacity. Such the conventional system thus described above is illustrated in a Mollier diagram shown in FIG. 2. With reference to FIG. 2, the capacity, say, approximately 10 horse power, of the outdoor unit can be gained to approximately 12 horse power thereof by an increased amount A due to the supercooling. In this case, an ice thawing operation for the supercooling is executed simultaneously with a normal cooling operation at all times. Approximately 20% of whole capacity accounts for one due to heat stored in the air conditioning system.

Now, in this type of the conventional air conditioning apparatus, ice making and heat regeneration are executed by utilizing an excess nightly power which is costwise effective. Then, the ice made and heat stored during night time is utilized for a cooling or heating during daytime. As a result thereof, a user can have an air conditioning bearing a relatively low running cost therefor; an electric power company that supplies the electric power to the users realizes to cut down on a peak for an electric power demand and tries to shift optimally a power peak during the daytime.

However, such conventional systems as mentioned above can only cut down on a whole capacity thereof by approximately as much as 20% in light of cutting down on the electricity, thus not being able to offer an effective means by which the power peak is shifted optimally. Moreover, in this case, the whole refrigerants being in a liquid state exist inside ice making unit 15 in heat regenerative tank 17, so that an amount of the refrigerant to be enclosed therein becomes undesirously large. Thus, the refrigerants are excessively supplied at other operational modes than that of the heat regenerative operation. Thereby, danger for the liquid bag is increased so as to effect the reliability for the air conditioning system. Moreover, such a system is not desirous in terms of global environment consciousness which recently enjoys a public consensus.

Figure 3:
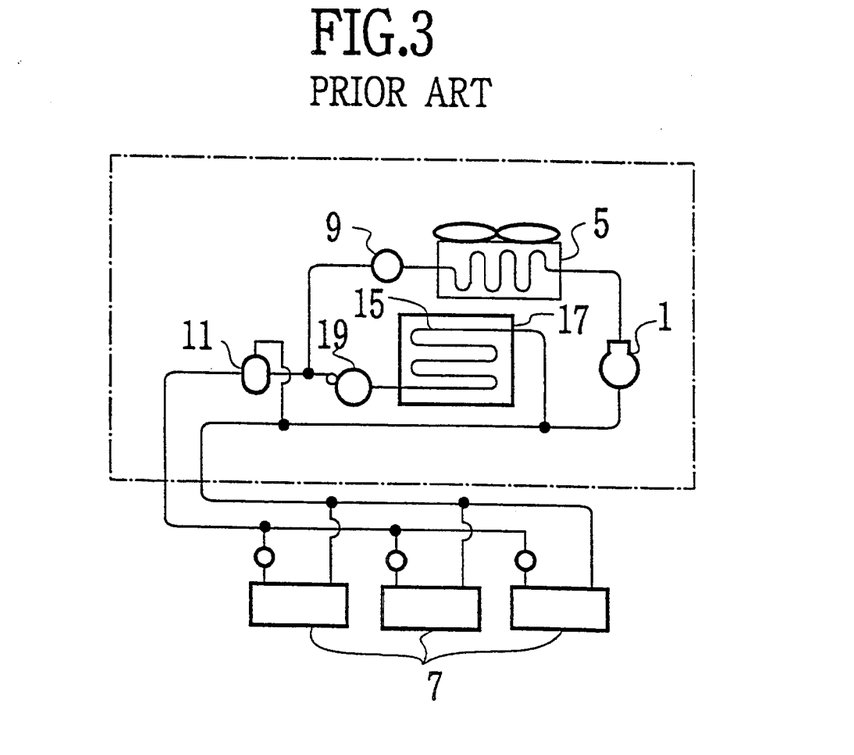
FIG. 3 shows another conventional air conditioning system.

FIG. 3 shows another conventional air conditioning system.

In an another air conditioning system shown in FIG. 3, a circuit having heat regenerative tank 17 and refrigerant pump 19 is incorporated therein in parallel to the refrigerant circuit of normal indoor heat exchanger 7 shown in FIG. 1. Thereby, both the cooling operation by compressor 1 and the refrigerant transfer by refrigerant pump 19 can be independently or simultaneously executed. Not to mention, the ice making operation is carried out by compressor 1.

Figure 4:
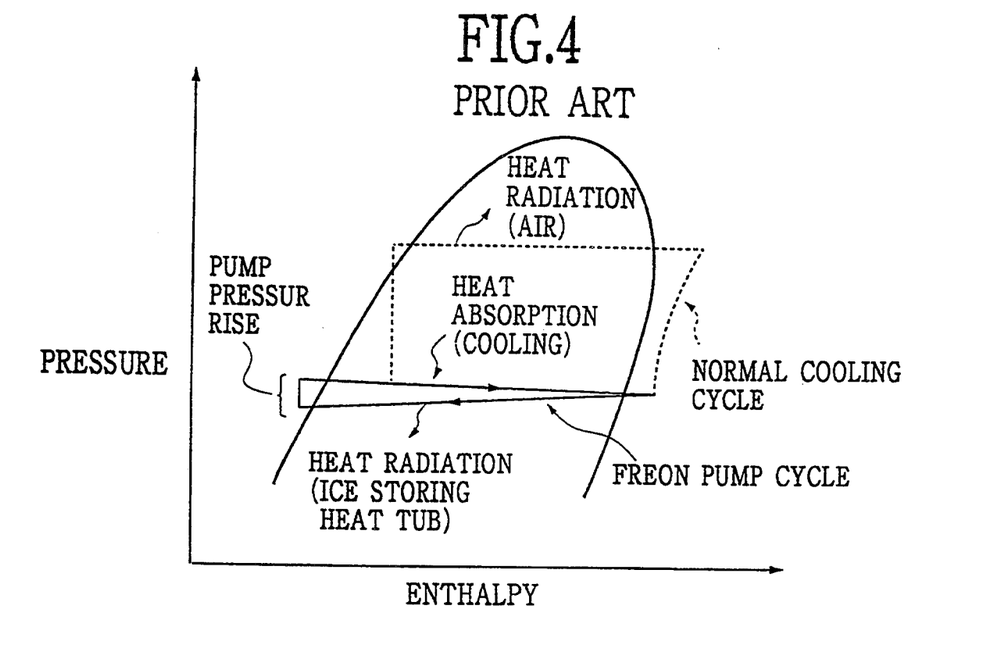
FIG. 4 is a Mollier diagram showing the cooling operational mode for the air conditioning apparatus shown in FIG. 3.

In the air conditioning system shown in FIG. 3, a low power cooling operation can be realized utilizing refrigerant pump 19 by stopping compressor 1 after the ice making operation. The low power cooling operation is illustrated by a solid line shown in FIG. 4. Thereby, a power peak value is reduced, so as to off tier means for effectively shifting the power peak. In FIG. 4, a broken line shows a cycle at the time of the normal cooling operation.

Figure 5:
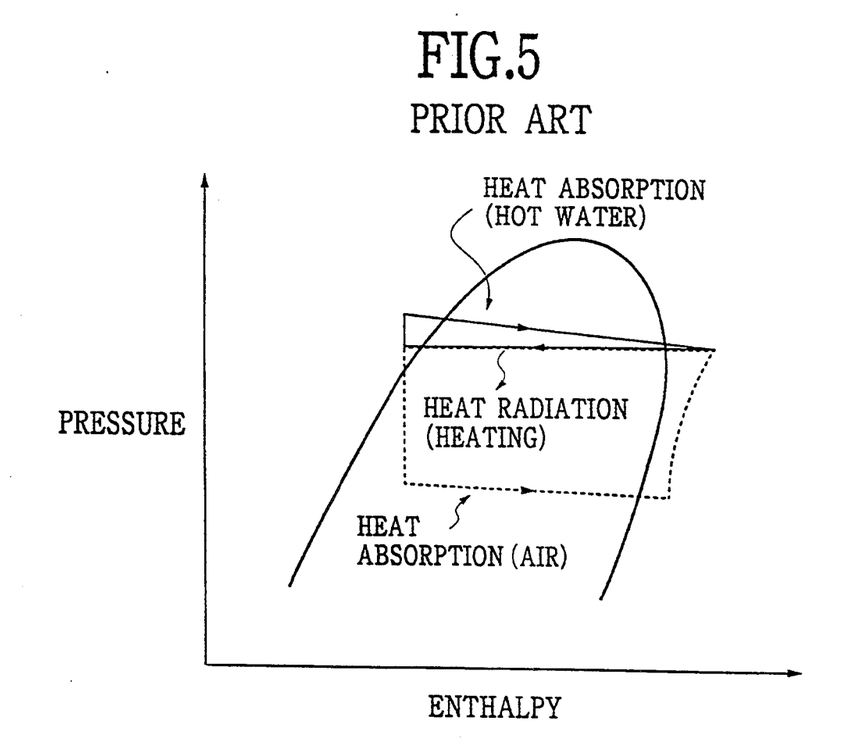
FIG. 5 is a Mollier diagram showing the heating operational mode for the air conditioning apparatus shown in FIG. 3.

With reference to the solid line shown in FIG. 5, a heat regenerative operation becomes possible by storing hot water in heat storing tank 17 shown in FIG. 1 and FIG. 3. In FIG. 5, the broken lines show a cycle at the time of the normal heating operation. However, since there is utilized refrigerant pump 19, a temperature of the hot water gradually decreases, and finally the heating operation becomes inoperative. In other words, the hot water stored in the night time at a temperature as high as approximately 60° C. can only be utilized up to approximately 40° C. For the heating operation. Thus, there exists only a temperature difference of about 20° C. which is too small a range to be effectively used. Thereby, time duration during which the heating operation is possible is rather short, thus creating a disadvantageous aspect where an efficient and effective heating operation can not be carried out.

Under the cooling operation period, an increase of the capacity for the outdoor unit can be possible by simutaneously operating both refrigerant pump 19 and compressor 1, thus possibly realizing the increase of an installment capacity for the outdoor unit. However, in case of the heating operation, the installment capacity for the outdoor unit can not be reduced due to the fact that an amount of the heat stored is not enough. Thus, there is caused an disadvantageous aspect in the light of imbalance of capacities between the cooling operation and the heating operation.

Accordingly, in the conventional air conditioning systems, it is impossible to perform an effective peak-cut operation where the electric power peak is effectively shifted optimally. Moreover, even if such a peak-cut operation is possible, there is still a problem where the heat regenerative operation can not be effectively performed at the time of heating operation and there exists imbalance of capacities between the cooling operation and the heating operation.

SUMMARY OF THE INVENTION

In view of the foregoing drawbacks, it is therefore an object of the present invention to provide an air conditioning apparatus capable of operating an effective peak-cut operation and of carrying out effective thermal storage operation at the time of heating operation.

To achieve the object, there is provided an air conditioning apparatus equipped with a cooling cycle, using a refrigerant, connected to a compressor, an outdoor heat exchanger and an indoor heat exchanger by way of a refrigerant pipe therethrough, the air conditioning apparatus comprising: a heat regenerative tank for storing heat of refrigerant circulating in the cooling cycle; a heat regenerative refrigerant pipe disposed in parallel to the indoor heat exchanger, the heat regenerative refrigerant pipe being provided such that the refrigerant, which is heat-exchanged between a member placed in the heat regenerative tank, flows therethrough; an auxiliary compressing means provided in the heat regenerative refrigerant pipe disposed between the heat regenerative tank and a gas line of the refrigerant pipe; expansion means for controlling expansion of the refrigerant and which is disposed in the heat regenerative refrigerant pipe between the heat regenerative tank and a liquid line of the refrigerant pipe; switching means for changing the direction of a flow of the refrigerant discharged from the auxiliary compressing means, the switching means being disposed between the heat regenerative tank and the gas line of the refrigerant pipe; and bypass means for bypassing the auxiliary compressing means and the switching means, the bypass means including an open-close means therein.

To achieve the object, there is also adopted a method for an air conditioning apparatus substantially equipped with a main compressor, an indoor heat exchanger and an outdoor exchanger, utilizing a refrigerant, the method comprising the steps of: providing and activating an auxiliary compressor between the main compressor and the indoor heat exchanger; cooling a gaseous refrigerant outputted from the auxiliary compressor; heat-exchanging the gaseous refrigerant; condensing the refrigerant so as to be stored in a tank; transferring a condensed refrigerant in a preceding step to the indoor heat exchanger; evaporating a condensed refrigerant; and transferring the evaporated refrigerant back to the auxiliary compressor.

Other features and advantages of the present invention will become apparent from the following description taken in conjunction with the accompanying drawings.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to FIGS. 6 though 10.

EMBODIMENT NO. 1

Figures 6, 6A:
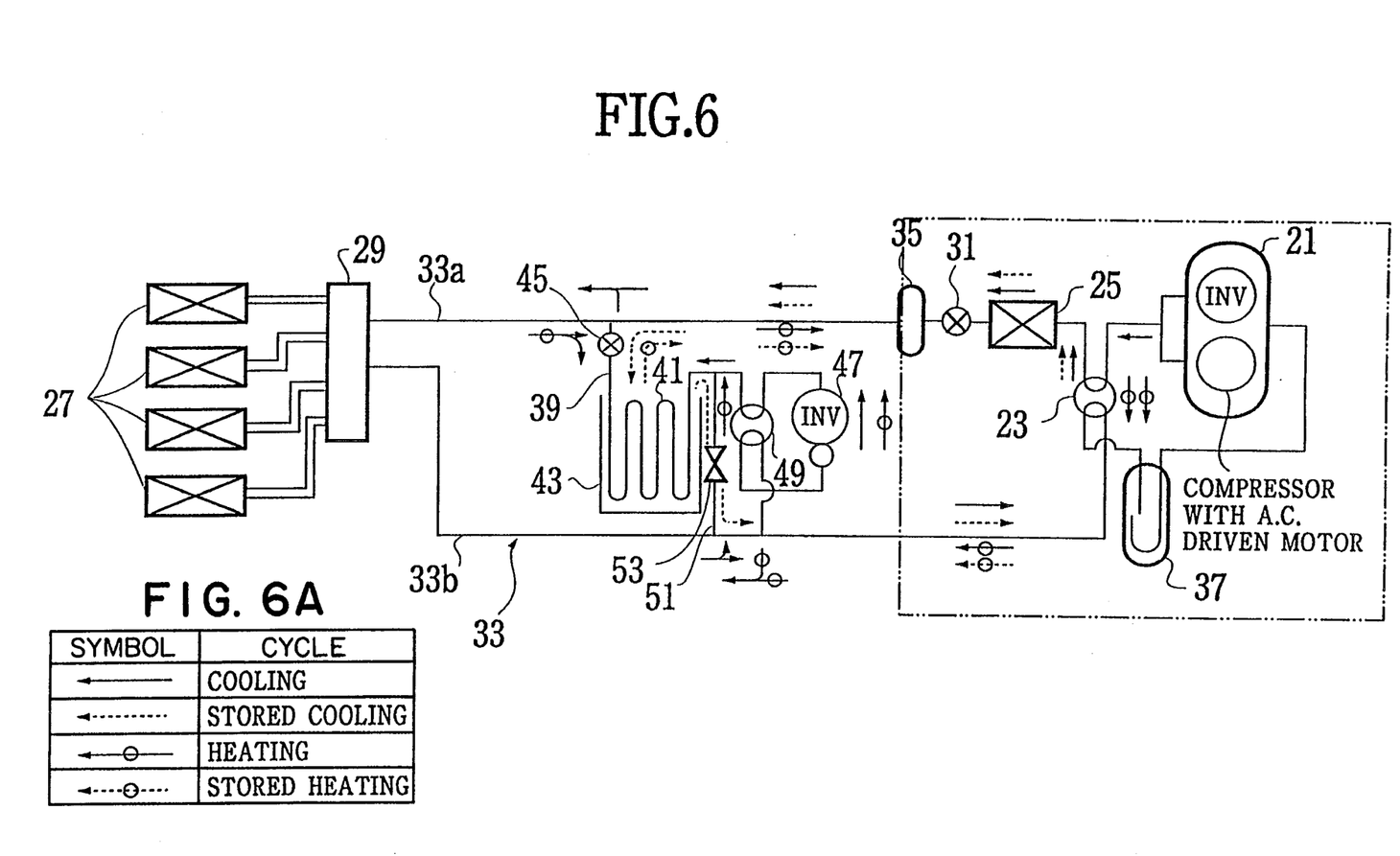
FIG. 6 is a cooling cycle configuration for a whole system of an air conditioning apparatus according to the first embodiment of the present invention.
FIG. 6A is a symbol chart showing the symbols used in FIG. 6 to indicate the cooling and heating cycles.

FIG. 6 is a cycle configuration for a whole system of an air conditioning apparatus according to the first embodiment of the present invention.

With reference to FIG. 6, there are provided a plurality of indoor units in the air conditioning apparatus, thus forming a so-called a multiple air conditioning system.

Still referring to FIG. 6, tile air conditioning apparatus presenting the above cycle configuration comprises (1) compressor 21 which compresses and discharge a refrigerant; (2) 4-way valve 23 by which a flow direction of the refrigerant is switched on account off an operational status such as a cooling operation and heating operation; (3) outdoor heat exchanger 25 which becomes a condensing unit at the time of cooling operation while serving as an evaporator at the time of heating operation; (4) refrigerant distributor 29 which distributes the refrigerant to the plural indoor heat exchanger 27; and (5) expansion valve 81 which decreases the pressure of the refrigerant, where all of these above are connected to each other by way of refrigerant piping 33.

There is provided liquid tank 35 for storing refrigerant liquid in liquid line 58a of refrigerant pipe 33 between expansion valve 81 and indoor heat exchanger 27; there is provided accumulator 37 in gas line 33b of refrigerant pipe 33 between compressor 21 and 4-way valve 23.

In above refrigerant piping circuit, there is provided thermal storage refrigerant piping 39 which connects liquid line 33a and gas line 33b and which is arranged to be disposed in parallel to indoor heat exchanger 27. In thermal storage refrigerant pipe 89, there is provided thermal storage tank 48 in which thermal storage heat exchanger 41 is provided therein and water is filled inside thereof serving as a thermal storage material. In a side of liquid line 33a of thermal storage tank 43, there is provided expansion valve 45 serving as expansion means. In thermal storage 39 off gas line 33b side, there are provided auxiliary compressor 47 and auxiliary 4-way valve 49 serving as switching means by which the direction of the refrigerant discharged from auxiliary compressor 47 changes at the time of the cooling and heating operation. Moreover, there is provided bypass piping 51 which connects thermal storage refrigerant pipe 39 and gas line 33b. Thermal storage refrigerant pipe 39 is disposed between auxiliary 4-way valve 49 and thermal storage tank 43. Bypass piping 51 is provided in a manner that it bypasses auxiliary compressor 47 and auxiliary 4-way valve 49. In bypass piping, there is provided 2-way valve 53 serving as open-close means.

In the air conditioning apparatus thus configured, there will be described four typical cooling operational modes and heating modes in detail, as follows.

A. Cooling Operation Modes

There are four operational modes for the cooling operational modes.
I. Normal cooling operation;
II. Ice making operation;
III. Thermal storage cooling operation;
IV. Simultaneous operation of both the normal cooling operation and the thermal storage cooling operation:

In the normal cooling operation (I), referring to FIG. 6, the refrigerant which is in a state of high-temperatured and high-pressured gas after being outputted from compressor 21, becomes a high-pressured liquid state in outdoor heat exchanger 25 by way of 4-way valve 23. Thereafter, the refrigerant becomes a two-phase state presenting also a low temperature therein, then it is transferred to the plural indoor compressors 27. Thereafter, the refrigerant is heat-exchanged and evaporated by indoor heat exchangers 27 and is transferred back to compressor 21 via 4-way valve 23. Auxiliary compressor 47 is in the state of stoppage throughout the normal cooling operation (I).

In the ice making operation (II), the high-temperature and high-pressured refrigerant outputted from compressor 21 becomes a high-pressure liquid state in outdoor heat exchanger 25 by way of 4-way valve 23. Thereafter, the refrigerant becomes a two-phase state presenting also a low temperature therein, by expansion valve 31. Thereafter, the two-phase state refrigerant is transferred to thermal storage heat exchanger 41 by way of expansion valve 45. The refrigerant that is thus heat-exchanged and evaporated by heat exchanger 41, flows through bypass piping 51 having 2-way valve 53 which is in an open mode, so as to be transferred back to compressor 21 via 4-way valve 23. In heat exchanger 41, water in thermal storage tank 43 is cooled by the refrigerant so as to form ice. In the ice making operation (II), heat exchanger 41 serves as an evaporating unit where a role for such an evaporating unit is played by indoor heat exchanger 27 in above normal cooling operation (I). Notice that auxiliary compressor 47 is not utilized in this ice making operation (II).

In the thermal storage cooling operation (III), the cooling operation is carried out by auxiliary compressor 47 while main compressor 21 is not involved in the operation, that is, the main compressor 21 is stopped. The gaseous refrigerant outputted from auxiliary compressor 47 is cooled by the ice and is heat-exchanged so as to be condensed in thermal storage heat exchanger 41 by way of auxiliary 4-way valve 41. The condensed refrigerant is transferred to indoor heat exchangers 27 by way of expansion valve 45 which is in a fully opened state, so that, after it evaporates there, the refrigerant is transferred back to auxiliary compressor 47 via auxiliary 4-way valve 49. Then, 2-way valve 58 is in a state of being closed and expansion valve 45 is in a state of being fully opened, so that there is presented no expanding process and the auxiliary compressor 47 seldom compresses the refrigerant. Instead, the auxiliary compressor 47 plays a role of a gas pump, so that electric power necessary for the cooling can be minimum. Specifically, the air conditioning apparatus thus configured can reduce the electric power consumption by at least more than half compared to that in the conventional practice. In other words, a boosting means is not required in the present invention, and a peak-cut power operation is effectively realized by shifting the power peak smoothly and optimally. Moreover, since a majority of heat exchanger 41 located inside thermal storage tank 48 is filled with two-phase state of vapor-liquid, there is no immediate need for a large amount of refrigerant to be enclosed therein.

In the simultaneous operation (IV) of both the normal cooling operation and the cooling operation, both compressor 21 and auxiliary compressor 47 are activated to execute the cooling operation. In this case, an output thereof can be increased on account of that there are two compressors in operation.

Figure 7:
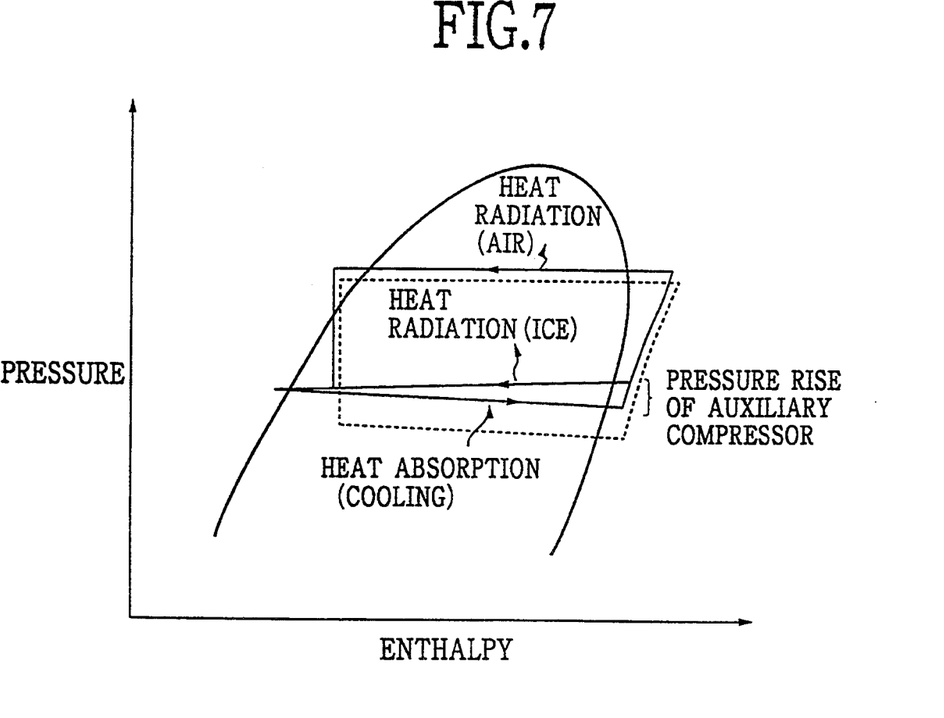
FIG. 7 shows a state achieved by the first embodiment in the form of Mollier diagram.

FIG. 7 shows such above states in the form of Mollier diagram. In the same figure, dotted lines therein indicate a cycle for the ice making process, whereas the solid curved line represents a system cycle for the simultaneous operation.

B. Heating Operational Modes

As for the heating operation modes, there are the following four operational modes therefor.
I. Normal heating operation;
II. Thermal storage operation;
III. Thermal storage heating operation;
IV. Simultaneous operation of both the normal heating operation and the thermal storage heating operation.

In the normal heating operation (I), a high-temperature and high-pressured gaseous refrigerant outputted from compressor 21 is transferred to indoor heat exchanger 27 through 4-way valve 23. Thereafter, the refrigerant is heat-exchanged and condensed so as to become a two-phase flow by expansion valve 31. After the refrigerant becomes a state of the two-phase flow, the refrigerant is evaporated in outdoor heat exchanger 25 and is then transferred back to compressor 21 by way of 4-way valve 23. At this time, auxiliary compressor 47 is in a state of stoppage.

In the thermal storage operation (II), the high-temperature and high-pressured refrigerant outputted from compressor 21 is transferred to thermal storage tank 43 through 2-way valve 53. The refrigerant which is heat-exchanged and condensed in thermal storage tank 43, is evaporated in outdoor heat exchanger 25 through expansion valves 45, 31 and is then transferred to compressor 21. In thermal storage tank 48, water in thermal storage tank 43 is heated by the refrigerant so as to be become hot water. In the thermal storage operation, the heat exchanger 41 operates as the condenser, whereas the indoor heat exchanger 27 serves as the condenser in the above normal heating operation (I). Auxiliary compressor 47 does not become active in this thermal storage operation (II).

In the thermal storage heating operation (III), the main compressor 21 is stopped, so that the heating operation is executed by auxiliary compressor 47 alone. The gaseous refrigerant outputted From auxiliary compressor 47 passes through auxiliary 4-way valve 49 and is heat-exchanged by indoor heat exchangers 27 so as to be condensed. The condensed refrigerant reaches to storage tank 43 by way of expansion vale 45 which is in the fully opened state. Then, the refrigerant is heated by hot water stored in the thermal storage tank 43 and is evaporated. Thereafter, the refrigerant is transferred back to auxiliary compressor 47 via auxiliary 4-way valve 49. Then, 2-way valve 53 is then in the closed state. In this case, a heat source temperature in thermal storage tank 43 is sufficiently high enough in an initial stage of the operation. Thus, expansion valve 45 is in the fully opened state and there is seldom caused an expanding process therefor. As a result thereof, auxiliary compressor 47 rarely compresses the refrigerant, so that auxiliary compressor 47 plays a role of a gas pump. Thereafter, an expanding degree for expansion valve 45 is gradually increased (strengthened) so as to gradually lower an evaporation temperature of the refrigerant in a manner that the heat of heat storage tank 43 is pulled up. This is due to the fact that the heat source temperature declines as time elapses. Therefore, even if the temperature in heat storage tank 43 is decreased, a thermal storage operation is still executable. Moreover, since utilized is a sufficiently large temperature difference, there can be secured a large amount of thermal storage compared to the cooling operation. Moreover, similar to what is described in the thermal-storage ice making cooling operation A(III), since a majority of heat exchanger 41 located inside thermal storage tank 48 is filled with two-phase state of gas and liquid, there is no immediate need for a large amount of refrigerant to be enclosed therein.

In the simultaneous operation of both the normal heating operation and the thermal storage heating operation (IV), both compressor 21 and auxiliary compressor 47 are utilized to achieve an optimal heating operation. In this case, heating output therefrom is significantly increased since two compressors are operated. In other words, there is obtained a same level of capacity as in the cooling operation, so that there can be maintained a stable operation where the capacities for both the heating and cooling operation are equal and well balanced.

Figure 8:
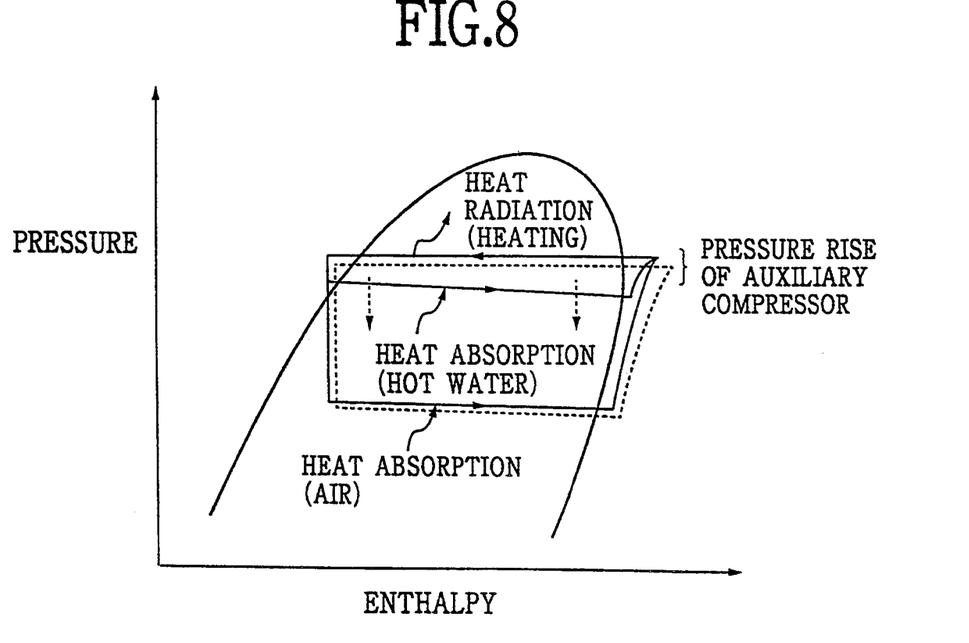
FIG. 8 is a Mollier diagram showing the heating operational mode for the air conditioning apparatus shown in FIG. 6.

The above significant effects are illustrated in a Mollier diagram shown in FIG. 8. In FIG. 8, dotted lines indicated a cycle at time hot water (thermal storage) is made, whereas a square-like solid line indicates the operation cycle for the simultaneous operation.

EMBODIMENT NO. 2

Figure 9:
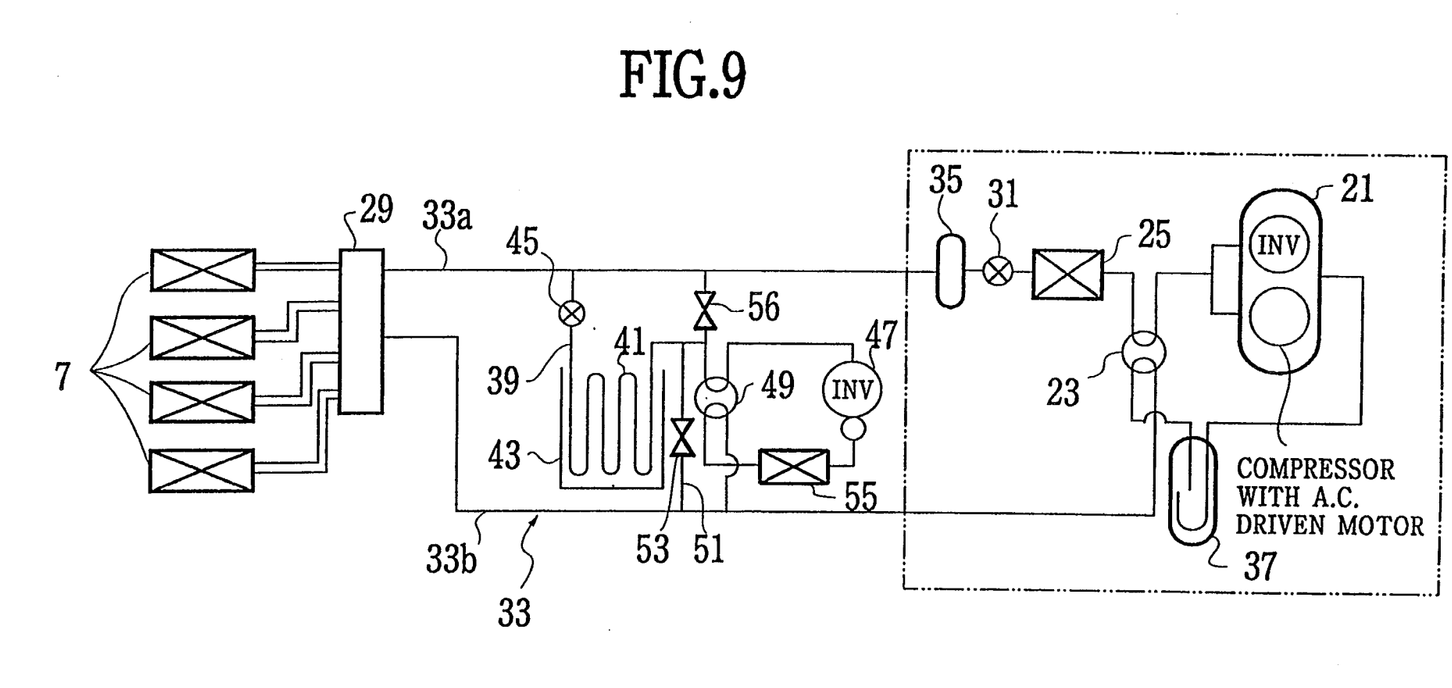
FIG. 9 is a cooling cycle configuration for an air conditioning apparatus according to the second embodiment of the present invention.

FIG. 9 is a cycle configuration for the whole system of an air conditioning apparatus according to the second embodiment. In this second embodiment, there is provided refrigerant heating unit 55 at a suction side of auxiliary compressor 47. Thereby, there is gained a significantly effective air conditioning system, for example, in a special case where rather increased heating capacity is required in a cold weather district and the like. The position to attach refrigerant heating unit 55 is not limited to the suction side of auxiliary compressor 47. It shall be appreciated that refrigerant heating unit 55 may be installed in a manner that the unit 55 is positioned so as to directly heat a thermal storage material inside thermal storage tank 43.

EMBODIMENT NO. 8

Figures 10, 10A:
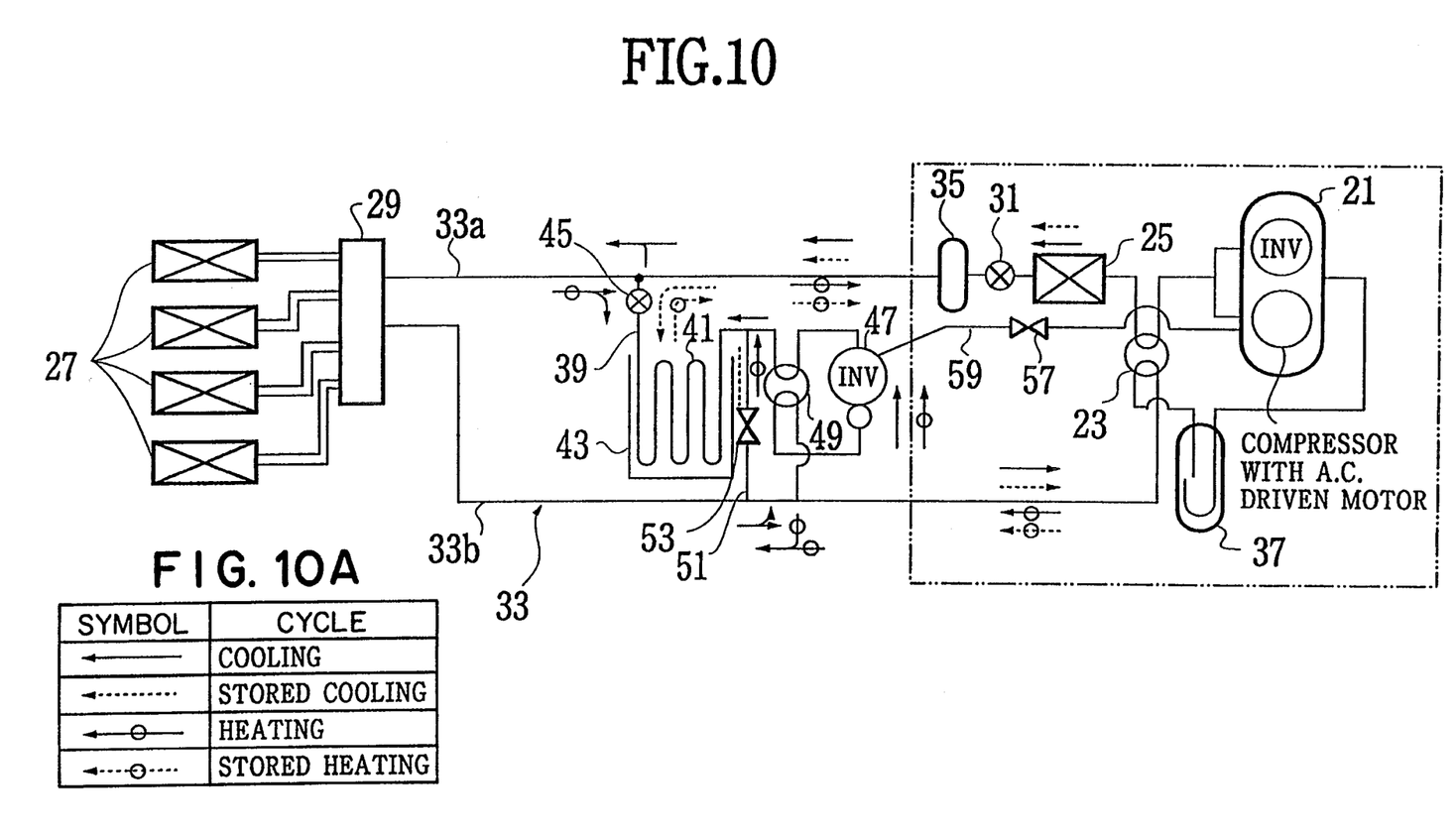
FIG. 10 is a cooling cycle configuration for an air conditioning apparatus according to the third embodiment of the present invention.
FIG. 10A is a symbol chart showing the symbols used in FIG. 10 to indicate the cooling and heating cycles.

FIG. 10 is a cycle configuration for the whole system of an air conditioning apparatus according to the third embodiment. In this third embodiment, the main compressor 21 and the auxiliary compressor 47 are connected to each other by homogeneous-pressure piping 59 which serves as a coupling pipe having a two-way valve 57 that serves as an open-close means. Thereby, it is avoided that a lubricant is stored only in one side of either the main compressor 21 or the auxiliary compressor 47. In other words, two-way valve 57 may be opened so that the lubricant flows into either side of compressors 21, 47 through homogeneous-pressure piping 59, in accordance with a level in which the lubricant is stored therein. As a result thereof, the level of lubricant stored in both compressors 21, 47 can be maintained at the same level. In a case where a pressure in respective compressors 21, 47 differs depending on an operational state in question, the two compressors 21, 47 may be forcibly operated under an even-pressure operation or the like in the initial state of or during the operation at a proper timing, so that the level of lubricants at both sides can be made equal to each other.

The refrigerant, between which the heat exchange is performed with the thermal storage material inside the thermal storage tank, flows through the thermal storage refrigerant piping. By employing the present invention characterized by that the thermal storage refrigerant piping is arranged in parallel to the indoor heat exchanger, and furthermore, that there is provided the auxiliary compressor between the thermal storage tank and the gas line of the refrigerant piping, there can be obtained significantly desirous effects as follow:

In a case where the air conditioning is executed utilizing the heat stored in the thermal storage tank, there is seldom caused the expanding process and thus the auxiliary compressor plays a role of the gas pumping unit. Thereby, an efficient and optimally effective power-peakcut operation is executed for shifting optimally the power peak as evidenced in the Mollier diagrams figures attached to this application.

Moreover, in the case of heating operation utilizing the thermal storage tank, evaporating temperature of the refrigerant is decreased as the temperature of the thermal storage tank declines where the thermal storage tank serves as the heat source. This is achieved by strengthening the expansion valve. Thereby, a temperature range usable in the thermal storage tank is significantly widened, thus realizing ever optimal thermal storage heating operation.

Moreover, there is provided a configuration where the main compressor and the auxiliary compressor are connected by the coupling pipe having the open-close means therein. Therefore, the levels of lubricant at the both sides of the main compressor and the auxiliary compressor can be made equal depending on the level of the lubricant stored in both the main compressor and auxiliary compressor.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. An air conditioning apparatus equipped with a cooling cycle, using a refrigerant, connected to a compressor, an outdoor heat exchanger and an indoor heat exchanger by way of a refrigerant pipe therethrough, the air conditioning apparatus comprising:

a heat regenerative tank for storing heat of refrigerant circulating in the cooling cycle;

a heat regenerative refrigerant pipe disposed in parallel to the indoor heat exchanger, the heat regenerative refrigerant pipe being provided such that the refrigerant, which is heat-exchanged between a member placed in the heat regenerative tank, flows therethrough; and an auxiliary compressing means provided in the heat regenerative refrigerant pipe disposed between the heat regenerative tank and a gas line off the refrigerant pipe.

2. The air conditioning apparatus of claim 1, wherein the compressor and the auxiliary compressing means are connected to each other by way of a coupling pipe having open-close means therein.

3. An air conditioning apparatus equipped with a cooling cycle, using a refrigerant, connected to a compressor, an outdoor heat exchanger and an indoor heat exchanger by way of a refrigerant pipe therethrough, the air conditioning apparatus comprising:

a heat regenerative tank for storing heat of refrigerant circulating in the cooling cycle;

a heat regenerative refrigerant pipe disposed in parallel to the indoor heat exchanger, the heat regenerative refrigerant pipe being provided such that the refrigerant, which is heat-exchanged between a member placed in the heat regenerative tank, flows therethrough;

an auxiliary compressing means provided in the heat regenerative refrigerant pipe disposed between the heat regenerative tank and a gas line of the refrigerant pipe;

expansion means for controlling expansion of the refrigerant and which is disposed in the heat regenerative refrigerant pipe between the heat regenerative tank and a liquid line of the refrigerant pipe;

switching means for changing the direction of a flow of the refrigerant discharged from the auxiliary compressing means, the switching means being disposed between the heat regenerative tank and the gas line of the refrigerant pipe; and bypass means for bypassing the auxiliary compressing means and the switching means, the bypass means including an open-close means therein.

4. The air conditioning apparatus of claim 3, wherein the compressor and the auxiliary compressing means are connected to each other by way of a coupling pipe having open-close means therein.

* * * * *